United States Patent [19]

Hanna

[11] 4,308,631

[45] Jan. 5, 1982

[54] AUTOMATIC WHEEL WASHING APPARATUS

[76] Inventor: Daniel C. Hanna, 1133 SW. Rivington Dr., Portland, Oreg. 97201

[21] Appl. No.: 109,498

[22] Filed: Jan. 4, 1980

[51] Int. Cl.³ .............................................. B60S 3/06
[52] U.S. Cl. .............................. 15/53 B; 15/DIG. 2
[58] Field of Search ................ 15/DIG. 2, 53 B, 53 R

[56] References Cited

U.S. PATENT DOCUMENTS

| | | | |
|---|---|---|---|
| 3,346,895 | 10/1967 | Consolo | 15/53 B |
| 3,822,431 | 7/1974 | Van Brakel | 15/53 B |

FOREIGN PATENT DOCUMENTS

| | | | |
|---|---|---|---|
| 1655989 | 8/1971 | Fed. Rep. of Germany | 15/53 B |
| 2127301 | 12/1971 | Fed. Rep. of Germany | 15/53 B |
| 2126347 | 1/1972 | Fed. Rep. of Germany | 15/53 B |
| 2223111 | 11/1973 | Fed. Rep. of Germany | 15/53 B |

*Primary Examiner*—Edward L. Roberts
*Attorney, Agent, or Firm*—Klarquist, Sparkman, Campbell, Leigh, Whinston & Dellett

[57] ABSTRACT

The specification discloses improved wheel washers, in one embodiment of which a pair of cupped-face brushes and a cylindrical brush are mounted on a bar forming one side of a parallelogram linkage. The bar is spring biased toward a normal position in which each cupped-face brush faces somewhat toward an approaching car wheel to be washed, and, as the body of the car engages and progressively moves past feeler rollers, each cupped-face brush on the bar is swung thereby with the car to a position in which it will face the side of the wheel when the wheel comes alongside the brush. This initial canting of the cupped-face brushes causes them to enter into the somewhat hollow area of the wheel to clean the tire supporting structure and hub cap. In another embodiment, the feeler rollers are omitted and two rocker panel brushes are mounted on opposite ends of a bar with a single canted, cupped-face brush mounted on the bar between the rocker panel brushes, the rocker panel brushes acting as feelers (or pushers) to be moved by the side of a car to provide desired cleaning positions for all the brushes.

6 Claims, 6 Drawing Figures

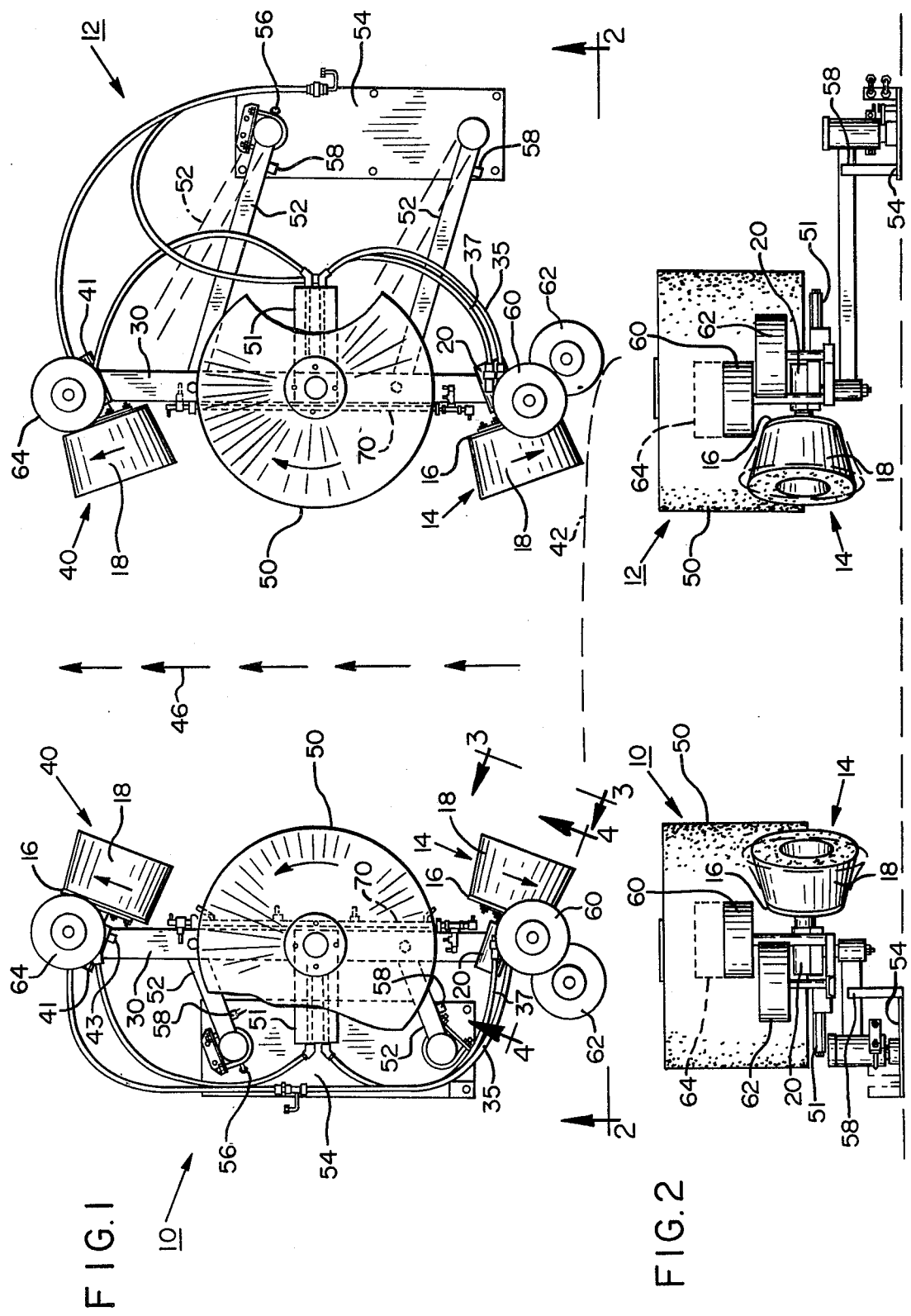

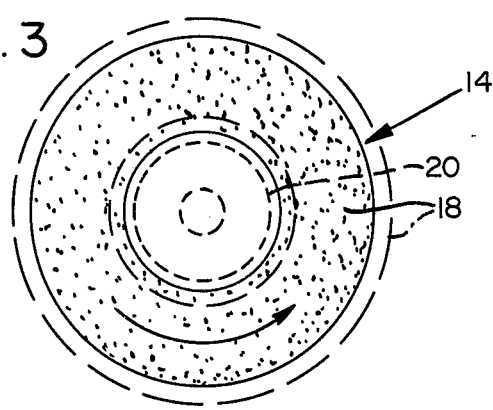
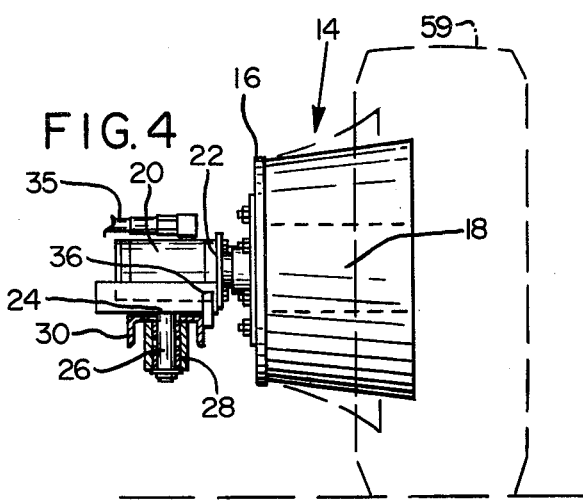
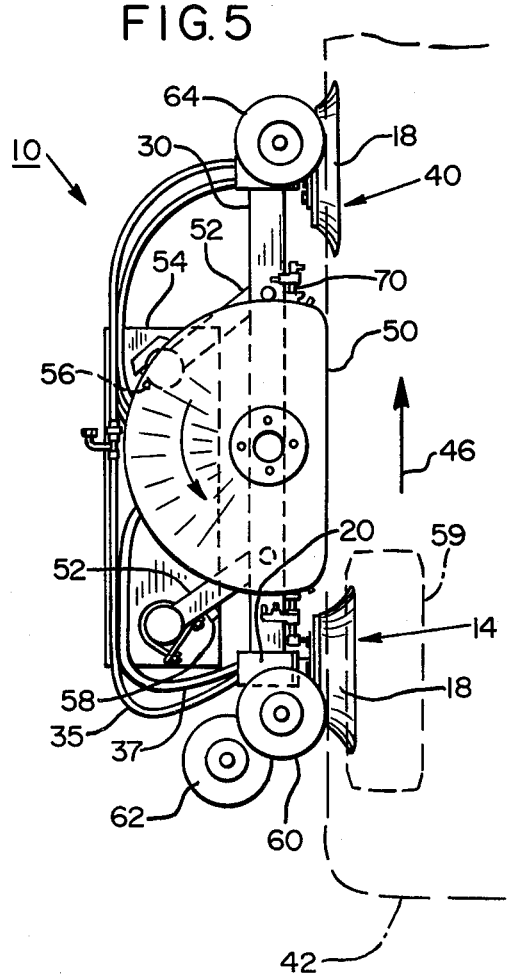
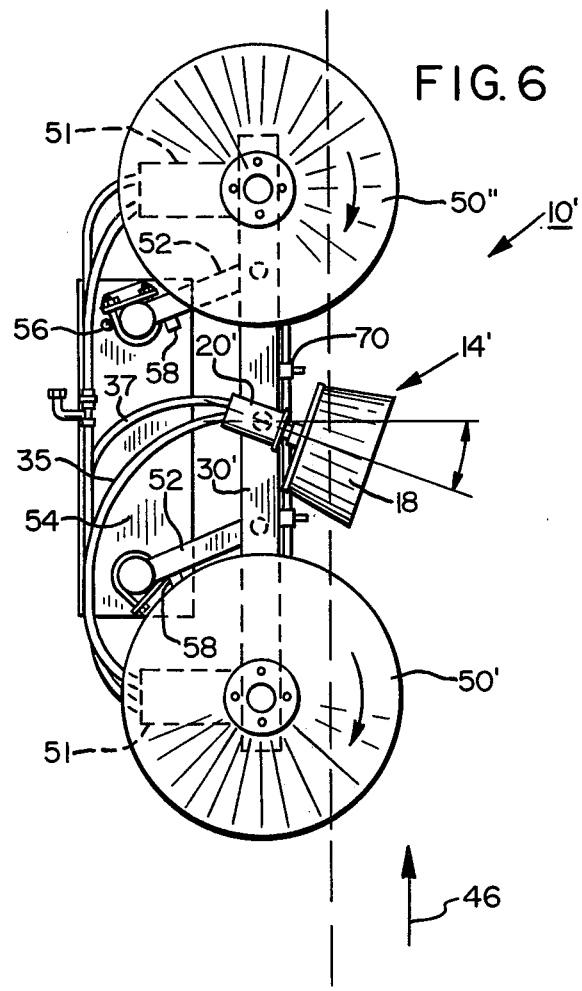

AUTOMATIC WHEEL WASHING APPARATUS

This invention relates to automatic wheel washers, and has for an object thereof the provision of new and improved automatic wheel washers.

Another object of the invention is to provide wheel washers which effectively scrub the somewhat cupped side of a wheel proper and hub cap.

A further object of the invention is to provide a wheel washer having a floating, cupped-face brush that initially is canted toward a car wheel and then is moved to a position facing the car wheel.

The presently preferred way of carrying out the invention will now be described with reference to the accompanying drawing, in which:

FIG. 1 is a top plan view of a portion of a car wash apparatus having wheel washers forming one embodiment of the invention;

FIG. 2 is an end elevation view of one of the wheel washers of FIG. 1 as viewed from line 2—2 in the direction indicated;

FIG. 3 is a side elevation view of the face of a cup-shaped brush taken along line 3—3 of FIG. 2;

FIG. 4 is an enlarged, fragmentary, partially sectional view taken along line 4—4 of FIG. 1;

FIG. 5 is a top plan view of one side of the apparatus of FIG. 1 after the wheel washer has been moved by a car wheel to an extreme position; and FIG. 6 is a top plan view of one side of a wheel washer apparatus forming an alternate embodiment of the invention.

With reference to FIGS. 1-5 wherein like numerals designate like parts, wheel washers 10 and 12, each forming one specific embodiment of the invention, are nearly identical except for being allochiral (mirror-imaged), and only the wheel washer 10 will be described in detail. The wheel washer 10 includes a rotary brush 14 having a disc-like base 16 and bristles 18 arranged in an annulus so that the brush is generally cup-shaped as depicted in FIG. 3. With particular reference to FIG. 4, the brush 14 is mounted on and keyed to the shaft of a hydraulic motor 20 having a frame 22 bolted to a rotor mechanism 24 having a shaft 26 journaled in a bearing 28 fixed to a channel-shaped bar 30. The rotor mechanism 24 is normally biased to its fully canted position shown in FIGS. 1 and 2 by flexible hydraulic hoses 35 and 37, a stop 36 (FIG. 4) limiting clockwise movement to the position shown in FIG. 1. Only the hoses limit counterclockwise movement to a position in which the brush directly faces the car as shown in FIGS. 4 and 5. A second rotary brush 40, like the brush 14, is mounted on the opposite end of the bar 30 by a hydraulic motor 41 and rotor mechanism like the rotor mechanism 24.

The motor 41, brush 40 and associated rotor mechanism are biased by hydraulic hoses from a pump (not shown) and an exhaust to a normal position canting the brushh 40 toward a stop 43 and an approaching car 42 being washed and in the path of the lefthand wheels of the car, "wheel" being used to denote the circular metal tire supporting structure and hub cap, the car moving in the direction of an arrow 46. The rotary brush 40, like the brush 14, is movable by the car sides and the wheels from its canted position to a position which is perpendicular to the car. Accordingly, it will be appreciated that the brushes 14 and 40 are allowed to pivot about their respective rotor mechanisms so that they will tend to float in a horizontal plane while rotating with their bristles 18 cleaning the uneven surfaces of the wheels of the car 42. The brushes 14 and 40 preferably spin in opposite directions as indicated by the arrows superimposed thereon. It will be appreciated that such opposite spin directions will enable one rotary brush to clean some surfaces that might not be adequately cleaned by the other rotary brush.

In accordance with a desirable optional feature of the wheel washer 10, the rotary brushes 14 and 40 can be spaced apart by a distance equal to one-half the circumference of the typical automobile tire. In such an arrangement, wheels which are half shielded by skirts or similar body coverings will be completely cleaned, each rotary brush cleaning opposite halves of such partially covered wheels. It will be appreciated, of course, that a spacing between the rotary brushes 14 and 40 equal to 1.5 times the circumference of the typical automobile tire will achieve similar results, as long as tire sizes do not vary greatly from the typical tire size.

A cylindrical rocker panel brush 50 is mounted by a hydraulic motor 51 on the bar 30 between the brushes 14 and 40. The bar is carried by and pivotally connected to outer ends of parallel arms 52 pivotally mounted on a fixed base 54. The arms 52 are normally biased clockwise, by a torsion spring 56 (mostly hidden) toward the positions shown in FIG. 1 to engage a stop 58, and, when the car 42 is moved along side the wheel washer 10, the brushes, bar 30 and arms 52 are swung out to the position shown in FIG. 5, the brushes 14, 40 and 50 being pressed against the car 42. It will be appreciated that the flexibility of the bristles 18 permits the brushes to flatten out against the sides of the car 42 as depicted by the brush 40 in FIG. 5 or extend into the wheel cavity to engage the outer surfaces of a wheel 59 as depicted by the brush 14 in FIG. 5. Pairs of offset rollers 60, 62 and 64 engage the side of the car to prevent the brushes 14 and 40 from moving too far toward the car 42 and also to swing the bar 30 counterclockwise by an appropriate amount as the car goes by. The rollers 60, 62 and 64 are mounted on vertical posts as seen in FIG. 2, the posts being secured to the bar 30 or an extension thereof. The roller 62 makes initial contact with the front of the car 42 and the rollers 60 and 64 locate the bar 30 in the correct position relative to the side of the car 42. A spray bar 70 supplied with cleaning fluid sprays the wheels and lower side portion of the car as the car moves past the wheel washer 10. The wheel washer 12 operates identically on the opposite side of the car.

Now referring to FIG. 6, a wheel washer 10' forming an alternate embodiment of the invention will be described, similar numerals designating similar parts. The wheel washer 10' is similar to the wheel washer 10 but has two rocker panel brushes 50' and 50" at the ends of a bar 30' and further includes a single rotary brush 14' with its hydraulic motor 20' floatingly mounted like the previously described motor 20. The rollers 60, 62 and 64 of the previous embodiment are omitted and the rocker panel brushes are made stiff enough and are rotated at sufficient speed to keep the bar 30' at an optimum cleaning position. The bar 30' is mounted in the same manner as the previously described bar 30. If desired, two floating rotary brushes, instead of one, could be mounted between the two rocker panel brushes 50' and 50".

Although a preferred and one alternate embodiment of the invention have been described in detail, it will be understood that other alternative embodiments and various modifications thereof are within the spirit and scope of the invention as defined by the appended claims.

What is claimed is:

1. In a wheel washer,
a rotary brush having bristles extending from a face thereof generally in a direction parallel to the axis of rotation thereof,
means for mounting the brush for movement pivotally from a normal position partially facing a wheel of a car movable along a predetermined path to a second position in which the brush face is substantially parallel to the side of the car, means biasing the brush toward said normal position, and
means carried by the mounting means in a position to be engaged by the car and movable thereby to move the brush from the normal position thereof to the second position thereof.

2. The wheel washer of claim 1 comprising a second rotary brush of similar construction to the first-mentioned rotary brush, the second rotary brush being mounted on the mounting means a predetermined distance from the first-mentioned rotary brush and in the same horizontal plane therewith.

3. The wheel washer of claim 2 wherein the predetermined distance is equal one-half the circumference of the typical automobile tire.

4. The wheel washer of claim 2 wherein the predetermined distance is equal to one and one-half times the circumference of the typical automobile tire.

5. The wheel washer of claim 2 wherein the brushes rotate in opposite directions.

6. In a wheel washer,
parallelogram linkage means having an outer bar,
a pair of rotary cup-faced brushes pivotally mounted on opposite end portions of the bar,
generally cylindrical brush means mounted on the bar between the rotary face brushes,
means biasing the linkage means toward a normal position in which the rotary cup-faced brushes are in the path of a wheel of a car moved along a predetermined path and permitting the linkage means to swing the brushes to the side of the track as the wheel goes therepast,
and means mounting the rotary cup-faced brushes in normal positions partially facing the wheel when the linkage means is in its normal position and permitting the brushes to move to positions directly facing the side of the wheel when the linkage means swings the brushes to the side of the path.

* * * * *